(12) United States Patent
Heitz et al.

(10) Patent No.: US 12,498,277 B2
(45) Date of Patent: Dec. 16, 2025

(54) BODY-MOUNTABLE TEMPERATURE MONITOR ACCOUNTING FOR AMBIENT CONDITIONS

(71) Applicant: Verily Life Sciences LLC, South San Francisco, CA (US)

(72) Inventors: Roxana Heitz, Mountain View, CA (US); William Biederman, San Francisco, CA (US); Sean Frick, San Francisco, CA (US)

(73) Assignee: Verily Life Sciences LLC, Dallas, TX (US)

( * ) Notice: Subject to any disclaimer, the term of this patent is extended or adjusted under 35 U.S.C. 154(b) by 0 days.

(21) Appl. No.: 18/526,294

(22) Filed: Dec. 1, 2023

(65) Prior Publication Data
US 2024/0094069 A1   Mar. 21, 2024

Related U.S. Application Data

(62) Division of application No. 16/733,074, filed on Jan. 2, 2020, now Pat. No. 11,867,568.

(60) Provisional application No. 62/788,465, filed on Jan. 4, 2019.

(51) Int. Cl.
| G01K 13/20 | (2021.01) |
| G01K 1/14 | (2021.01) |
| G01K 1/143 | (2021.01) |
| G01K 1/20 | (2006.01) |
| G01K 7/22 | (2006.01) |

(52) U.S. Cl.
CPC ............ *G01K 13/20* (2021.01); *G01K 1/14* (2013.01); *G01K 1/143* (2013.01); *G01K 1/20* (2013.01); *G01K 7/22* (2013.01)

(58) Field of Classification Search
CPC .......... G01K 13/20; G01K 1/14; G01K 1/143; G01K 1/20; G01K 7/22
USPC ...................................... 374/163, 29
See application file for complete search history.

(56) References Cited

U.S. PATENT DOCUMENTS

| 2002/0191675 A1* | 12/2002 | Tokita | G01K 1/16 374/E7.042 |
| 2012/0109572 A1* | 5/2012 | Shimizu | G01K 13/20 702/131 |
| 2012/0238901 A1* | 9/2012 | Augustine | A61B 5/01 600/549 |
| 2017/0049397 A1* | 2/2017 | Sun | G01K 7/427 |
| 2018/0242850 A1* | 8/2018 | Ellis | A61B 5/02007 |
| 2019/0142280 A1* | 5/2019 | Bongers | A61B 5/0002 600/549 |
| 2020/0037884 A1* | 2/2020 | Ishida | A61B 5/01 |

* cited by examiner

*Primary Examiner* — Mirellys Jagan
(74) *Attorney, Agent, or Firm* — Haynes and Boone, LLP (57) ABSTRACT

A method of monitoring an internal body temperature of a patient includes detecting a skin temperature of the patient using a temperature sensor in a body-mountable temperature monitor attached to the patient; calculating, using the temperature sensor, a heat flux associated with the body-mountable temperature monitor based on selectively activating a heater in the body-mountable temperature monitor; and determining the internal body temperature of the patient using the skin temperature and the heat flux.

15 Claims, 7 Drawing Sheets

BODY-MOUNTABLE TEMPERATURE MONITOR ACCOUNTING FOR AMBIENT CONDITIONS

CROSS-REFERENCE TO RELATED APPLICATIONS

This application is a divisional of U.S. application Ser. No. 16/733,074, filed Jan. 2, 2020, which claims the benefit of the filing date of, and priority to, U.S. Application No. 62/788,465, filed Jan. 4, 2019, the entire disclosure of each is hereby incorporated herein by reference.

TECHNICAL FIELD

The present disclosure relates generally to devices and methods for measuring a body temperature of a patient.

BACKGROUND DESCRIPTION

Body mountable temperature monitoring devices often use skin temperature as a measure of internal body temperature. However, skin temperature is affected by ambient conditions in the area of the device, such as ambient temperature, ambient convection, ambient radiation, ambient conduction, etc. These conditions can affect skin temperature by varying amounts with little or no relation to internal body temperature. Therefore, using skin temperature without considering the ambient conditions can result in an incorrect measure of internal body temperature. Heat flux sensors can measure ambient conditions but are generally cost prohibitive and too large or bulky for a body mountable temperature monitoring device. Moreover, the addition of a heat flux sensor to a body mountable temperature monitoring device generally requires at least two temperature sensors to be placed on the monitoring device.

DETAILED DESCRIPTION

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
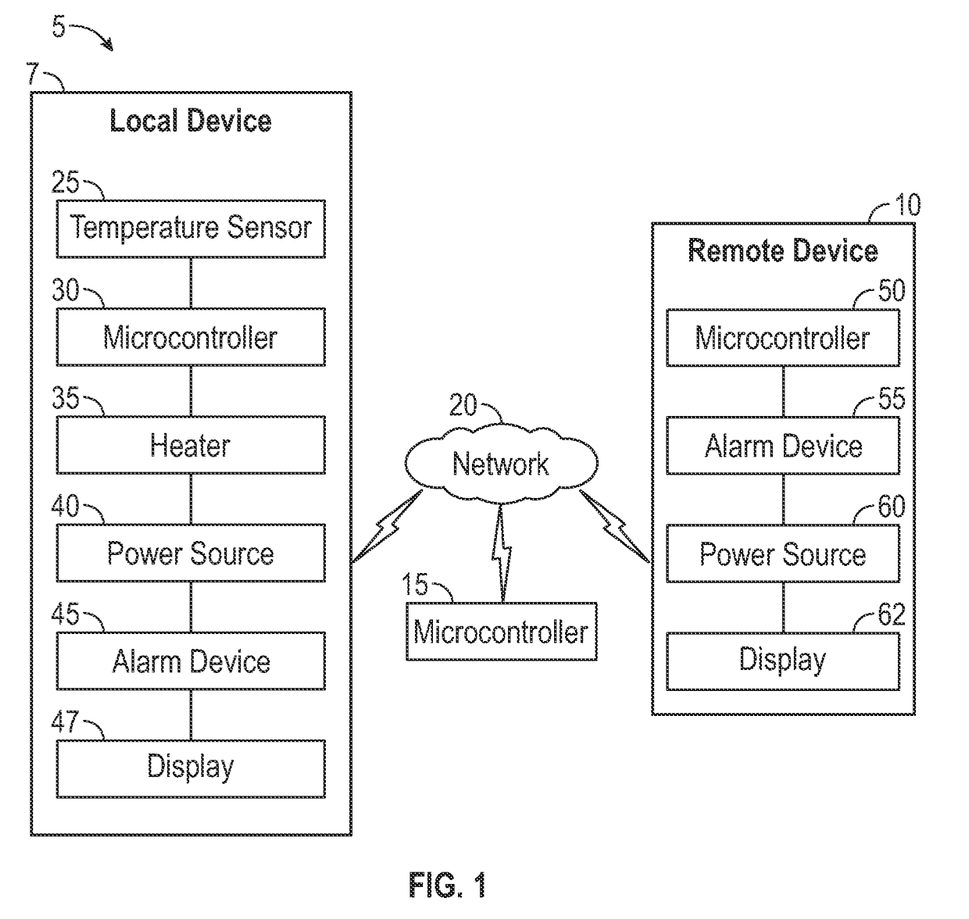
FIG. 1 is a diagrammatic illustration of a temperature monitor system, according to an example embodiment, the temperature monitor system including a local device and a remote device.

A system generally referred to by the reference numeral 5, as illustrated in FIG. 1, is an example body-mountable temperature monitor system that accounts for ambient conditions. The system 5 provides for continuous monitoring of a patient's temperature while considering ambient conditions and alerts a caregiver or the patient upon detection or estimation of an abnormal internal body temperature or a predicted future abnormal internal body temperature. In an example embodiment and as illustrated in FIG. 1, the system generally includes a local device 7, a remote device 10, and a remote microcontroller 15 that are in communication via a network 20. Generally, the local device 7 includes a temperature sensor 25, a microcontroller 30, a heating element or heater 35, a power source 40, an alarm device 45, and a display 47 that are operably coupled. In some embodiments, the alarm device 45 is the display 47. In an example embodiment, any one or more portions or sub-parts of the temperature sensor 25, the microcontroller 30, the heater 35, the power source 40, the alarm device 45, and the display 47 are operably coupled. While FIG. 1 depicts one temperature sensor 25, one microcontroller 30, one heater 35, one power source 40, one alarm device 45, and one display 47, the local device 7 may include multiple microcontrollers, multiple heaters, multiple temperature sensors, multiple power sources, multiple displays, and multiple alarm devices. Generally, the remote device 10 includes a microcontroller 50, an alarm device 55, a power source 60, and a display 62. In some embodiments, the display 47 is optional. In some embodiments, the alarm device 45 is optional.

Figure 2:
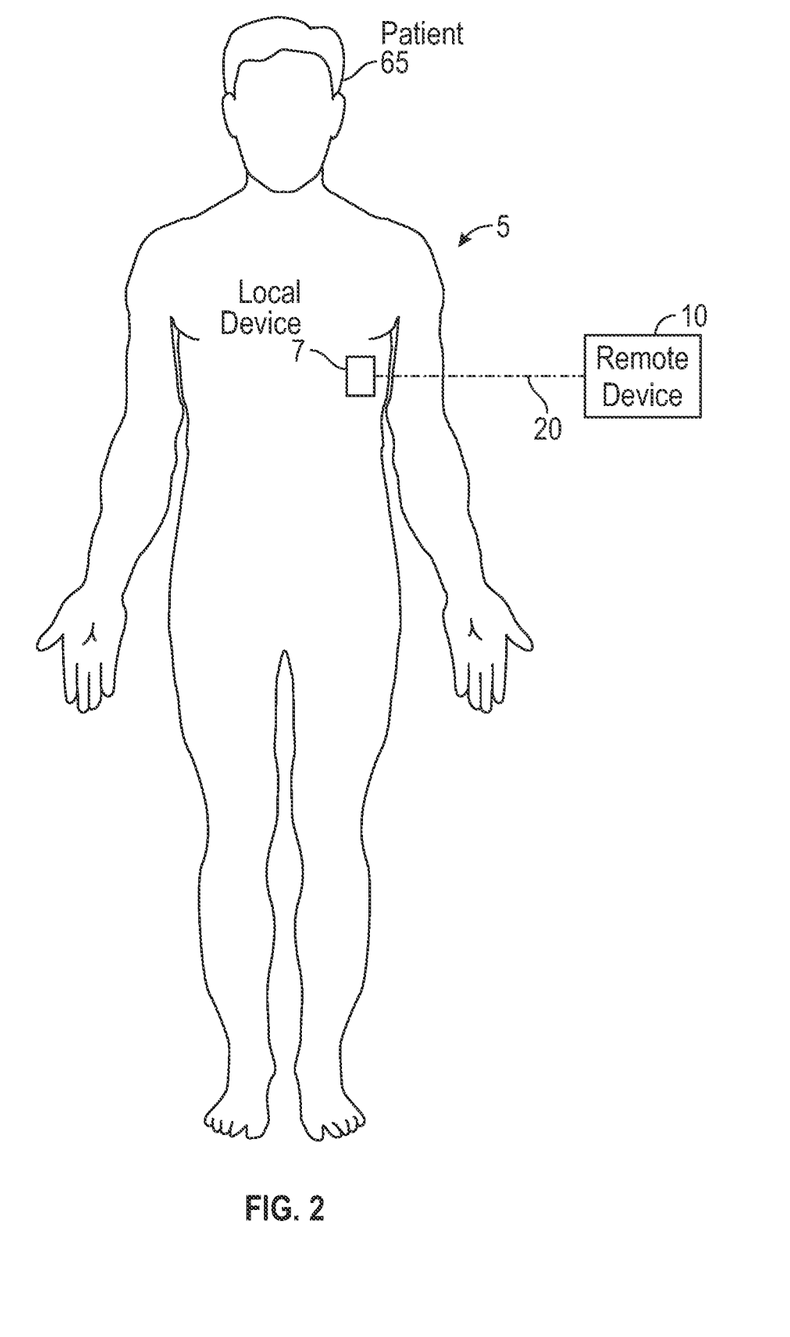
FIG. 2 is a diagrammatic illustration of a patient and the local device and the remote device of FIG. 1, according to an example embodiment.

As illustrated in FIG. 2, the local device 7 is coupled to a user or a patient 65. Generally, the local device 7 is a body-mountable apparatus or is at least attachable to the patient 65. For example, the local device 7 is an adhesive patch that is configured to attach directly to the skin of the patient 65. In other embodiments, the monitor is a bracelet (e.g., medical, identification, or ornamental), a necklace, a ring, an earring, etc. In some embodiments, the local device 7 forms a portion of an exercise device or an accessory for exercise, such as for example a heart rate monitor. In some embodiments, the local device 7 is proximate the patient 65 by being clipped or otherwise attached to a diaper (disposable or reusable), a sock, an armband, or other item worn by the patient 65. For example, the local device 7 may form a portion of or otherwise be coupled to a shirt, a pair of gloves, a sock, a boot, an undergarment, etc. While the local device 7 is illustrated as being attached to the torso of the patient 65, the local device 7 can be worn or coupled to another location on the patient 65, such as the arm, leg, neck, etc. In some embodiments, the local device 7 forms a portion of a baby accessory, such as a car seat.

In some embodiments and referring to FIGS. 1 and 2, the temperature sensor 25 is a thermal sensor, which may be a thermistor, a resistance temperature detector ("RTD"), a capacitance temperature sensor, a semiconductor device, an infrared camera or the like. In some embodiments, the temperature sensor 25 is a sensor that can measure the temperature of the patient's skin even while the temperature sensor is spaced from the skin of the patient 65 (not in direct contact with the patient's skin).

The microcontroller 30 is in communication with the temperature sensor 25 and the heater 35. Generally, the microcontroller 30 includes a processor and a memory. In some embodiments and when the local device 7 is configured for wireless communication with the remote device 10, the microcontroller 30 is configured for wireless communication (e.g., using cellular, wi-fi, or Bluetooth technologies) with the microcontroller 50 of the remote device 10 via the network 20. Wireless connectivity may be provided by a microcontroller, or a transceiver (not shown) coupled to the microcontroller as part of each device 7 and 10.

In some embodiments, the heater 35 includes a resistor, thermistor, etc. In some embodiments, the heater 35 is a radiator-like heater that includes a wire that is heated via passing a current through the wire. In some embodiments, the heater 35 is a positive temperature coefficient ("PTC") heater.

In some embodiments, the power source 40 is a battery or the like. However, in some embodiments the power source 40 is the user or is generated by movement of the user. For example, in some embodiments, the power source is harvested energy from the body of the patient 65 (e.g., harvest from motion, temperature, both motion and temperature). In some embodiments, the battery is non-rechargeable, but in other embodiments the battery is rechargeable.

In an example embodiment, the microcontroller 50 of the remote device 10 is identical to or different from the microcontroller 30, the alarm device 55 is identical to or different from the alarm device 45, the power source 60 is identical to or different from the power source 40, and the display 62 is identical to or different from the display 47. In some embodiments, the alarm device 55 is the display 62. In some embodiments, the remote device 10 is in communication with the local device 7 via the network 20. In some embodiments, the remote device 10 is a smart phone, tablet computer, personal digital assistant (PDA), a personal computing device (PCDs), or the like.

In an example embodiment, the network 20 includes the Internet, one or more local area networks, a Bluetooth low energy network, one or more wide area networks, one or more cellular networks, one or more wireless networks, one or more voice networks, one or more data networks, one or more communication systems, and/or any combination thereof.

Figure 3:
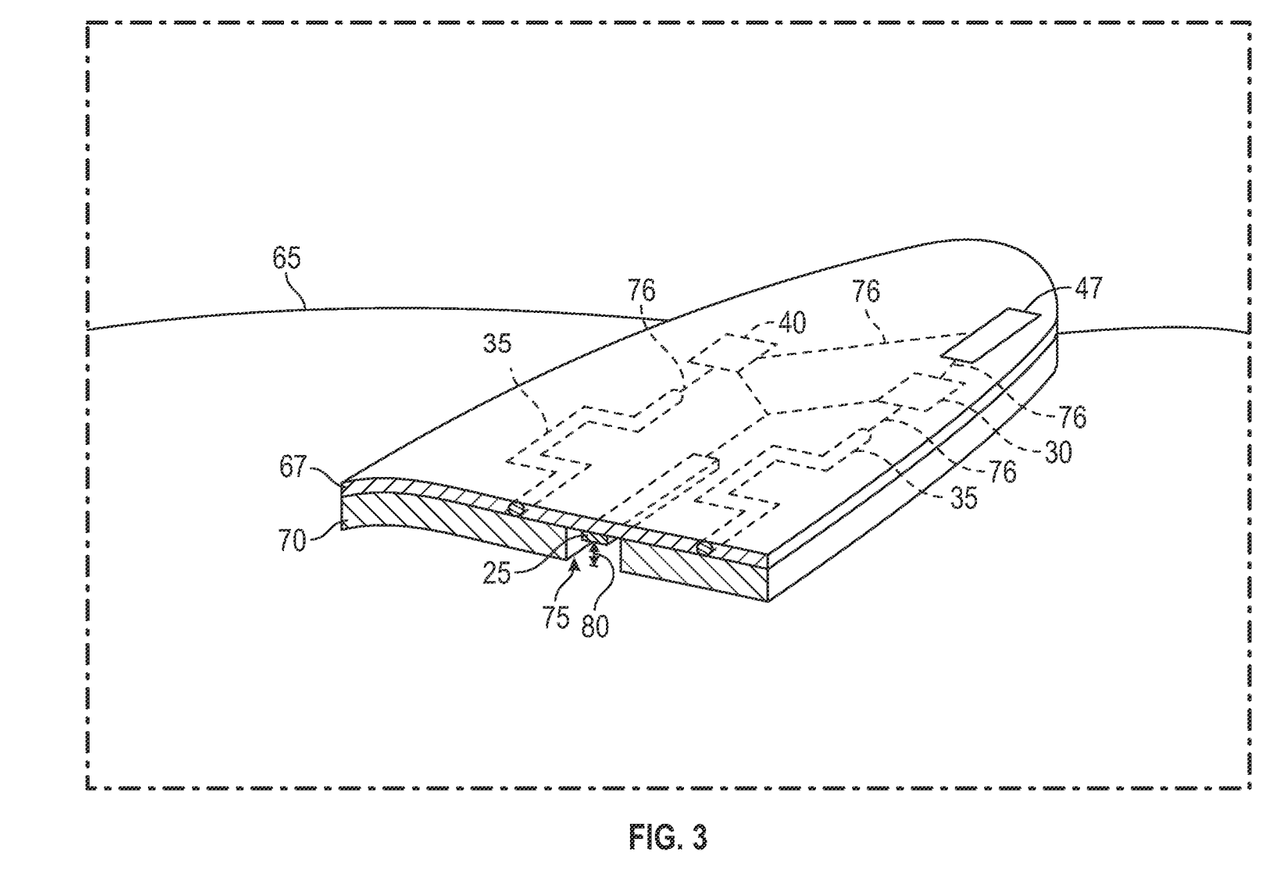
FIG. 3 is a sectional perspective view of one embodiment of the local device of FIG. 1 coupled to the patient of FIG. 2, according to an example embodiment.

A perspective, partial-cut away of one embodiment of the local device 7 is illustrated in FIG. 3. As illustrated, the local device 7 includes the microcontroller 30, the power source 40, the heater 35, the temperature sensor 25, and the display 47 coupled to a support substrate 67. The local device 7 also includes an adhesive layer 70 that is configured to couple the local device 7 to the skin of the patient 65. In some embodiments, the heater 35 is a type of wire that zig-zags or is otherwise placed around or near the temperature sensor 25. As illustrated, the temperature sensor 25 is spaced from the skin of the patient 65 but is in thermal contact with the patient. While the local device 7 is illustrated without a cover layer that extends at least partially over the support substrate, some embodiments of the local device 7 include such cover layer. Moreover, the placement of the microcontroller 30, the power source 40, the temperature sensor 25, and the heater 35 relative to the adhesive layer 70 and the support substrate 67 can vary. For example, in some embodiments the heater 35 is a screen-printed wire that forms a portion of the adhesive layer 70, the adhesive layer 70 is the support substrate 67, the support substrate 67 is the adhesive layer 70, and/or any one or more of the temperature sensor 25, the microcontroller 30, the heater 35, and the power source 40 are laminated between layers. As illustrated, an opening 75 is formed in the adhesive layer 70 and in the substrate 67 to allow a gap 80 to form between the temperature sensor 25 and the skin of the patient 65. However, in other embodiments, a portion of the adhesive layer 70 or a thermally conductive material, such as a copper filament, metal insert, or conductive gel, extends between the skin of the patient 65 and the temperature sensor 25. In some embodiments, the substrate 67 is fabricated with interconnects 76 designed to connect between the temperature sensor 25, the heater 35, the microcontroller 30, and the display 47. While the placement of the temperature sensor 25 is shown as between the skin of the patient 65 and the heater 35, in some embodiments, the heater 35 is between the skin of the patient and the heater 35 or the heater 35 and the temperature sensor 25 are placed at a same distance from the skin of the patient 65. In some embodiments, the temperature sensor 25 is positioned and configured to monitor and detect a skin temperature of the patient 65. However, in some embodiments, the temperature sensor 25 is positioned and configured to measure both the skin temperature and the air or fluid in the gap 80. In an example embodiment, the microcontroller 30 is programmed or wired to selectively activate the heater 35 for a period of time so that the heater 35 provides heat and deactivate the heater 35 for a period of time so that the heater does not provide heat. In an example embodiment, the microcontroller 30 controls the power delivered from the power source 40 to temperature sensor 25 and the heater 35.

In some embodiments, the display 47 is a flexible display and is or includes e-paper, an organic light-emitting diode ("OLED"), a segmented light-emitting diode ("LED") display, or the like. In some embodiments, the display 47 is a low power display that is integrated onto a film or the substrate 67 of the local device 7. For example, in some embodiments, the local device 7 is a bandage-type temperature sensing device having the substrate 67 onto which the temperature sensor 25, the heater 35, the microcontroller 30, the power source 40, and the display 47 are attached or fabricated directly. In some embodiments, one surface of the local device 7 includes the adhesive layer 70 for attaching the local device 7 to the skin of the patient 65 in a manner that also thermally couples the temperature sensor 25 to the skin of the patient 65. An opposing surface to the adhesive surface is visible to the patient 65 and displays the display 47. The substrate 67 may be polyimide, polyethylene terephthalate ("PET"), or another flexible material (e.g., material having a Young's modulus of between about 0.181 and about 3.21 GPa), and a process similar to a PCB manufacturing process is used to deposit metal traces and device footprints for the electronic components and the display 47 (e.g., screen printed electronics). The display 47 may be e-paper or a similar low power, flexible display technology, and utilize the PCB substrate 67 as the deposition substrate for the display materials. The substrate 67 may also contain other elements of a user interface which allow the user or patient 65 to interact with the electronics and display. In some embodiments, the thickness (measured in a direction perpendicular to the skin of the patient 65 when coupled to the patient 65) of the local device 7 is less than 0.6 cm, less than 0.3 cm, less than 0.2 cm, less than 0.1 cm, and/or less than 0.05 cm. In some embodiments, the display 47 includes multiple displays. In some embodiments, each of the temperature sensor 25 and the heater 35 is in direct wireless communication with the remote device 10 and/or a remote server. In some embodiments, the adhesive layer 70 is selected to have material properties permitting it to be peeled from the patient's skin after the monitoring is complete by pulling a corner or edge from the skin at an angle from the skin within a range from about 10 to 170 degrees without damaging the skin. In addition, and in some embodiments, the adhesive can be removed without damaging the skin without the use of water, soap, solvent or other releasing material. In some embodiments, the adhesive is selected to have an adhesion to LDPE, 180 Degree peel of 15-50 oz/inch width, and more particularly, about 20-50 oz/inch width, and more particularly, about 30-40 oz/inch width, and even more particularly, about 35-37 oz/inch width. The adhesive may be a skin-friendly, rubber-based adhesive. Further, the adhesive layer 70 is configured so that in some embodiments, less than 10% of the adhesive remains on the skin as residue. In other embodiments, less than 5% of the adhesive remains on the skin as residue.

Figure 4:
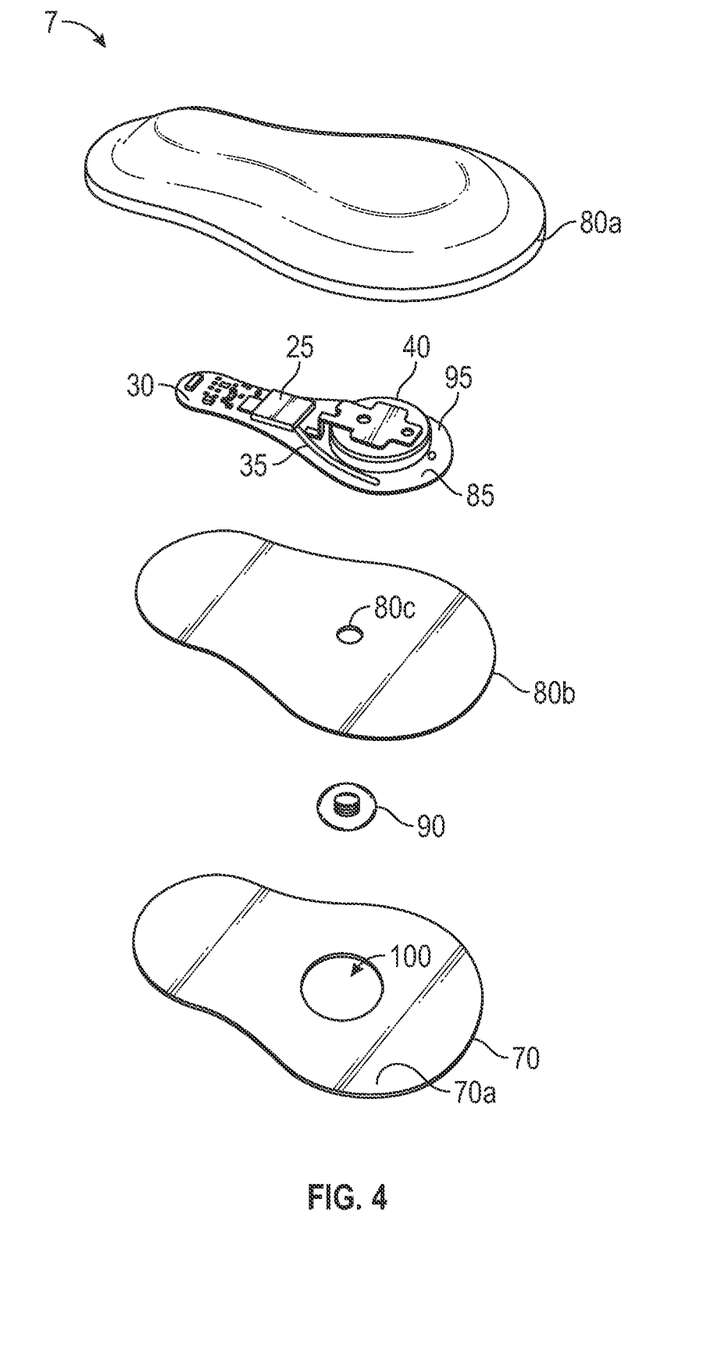
FIG. 4 is an exploded view of the local device of FIG. 1, according to an example embodiment

As illustrated in FIG. 4, another example of the local device 7 includes an upper housing 80a and a complimentary lower housing 80b that is configured to couple to the upper housing 80a. In some embodiments, the local device 7 is reusable or configured to be removed and reattached to the patient 65 multiple times. In some embodiments, the device 7 is a patch-like device that is attached, via adhesive or otherwise, to the torso of the patient. When the housings 80a and 80b are coupled together, a chamber is formed that houses a control system 85. A thermal contact 90 is coupled to the lower housing 80b and is in communication and/or in thermal contact with the control system 85 and the temperature sensor 25 via an opening 80c formed in the lower housing 80b. The adhesive layer 70, which is a double-sided adhesive layer, is in contact with the lower housing 80b.

In an example embodiment, the housings 80a and 80b are elastomeric housings. In some embodiments, the control system 85 includes a substrate 95, the temperature sensor 25, the microcontroller 30, the power source 40, and the heater 35. In some implementations, the substrate 95 can be a circuit board or printed circuit board (PCB). Additional or fewer components are possible. For example, the control system 85 may include a humidity sensor, or other biometric sensors that are in communication with the microcontroller 30. The temperature sensor 25 is in communication with the microcontroller 30. In some embodiments, an opening 100 is formed in the adhesive layer 70. In some embodiments, the opening 100 has a diameter that is greater than the outer diameter of the thermal contact 90. However, in other embodiments, the diameter of the opening 100 is equal to or less than the outer diameter of the thermal contact 90. In some examples, the thermal contact 90 facilitates physical measurement of properties of the body of the wearer (e.g., of the skin at the external body surface). As shown, the thermal contact 90 is a circular, rounded contact configured to protrude from the lower housing 80b and to make electrical and/or thermal contact with the skin of the external body surface of the wearer. In some embodiments, the thermal contact 90 extends between about 0.05 cm and about 0.2 cm from the lower housing 80b. In some embodiments, the contact 90 is in electrical contact with the temperature sensor 25 such that a galvanic skin response ("GSR") of the skin at the external body surface can be detected by the local device 7. However, in other embodiments, the contact 90 is in thermal contact only with the temperature sensor 25. Generally, the thermal contact 90 and the temperature sensor 25 are positioned and configured to continuously monitor and detect a temperature of the patient 65. In other embodiments, the thermal contact 90 and the temperature sensor 25 are positioned and configured to intermittently monitor the temperature of the patient. In some embodiments, the thermal contact 90 is a metal disc. In some embodiments, the control system 85 includes another temperature sensor that continuously monitors and detects a temperature within the chamber.

The adhesive layer 70 can be a double-sided adhesive layer having has one surface 70a that includes an adhesive configured to couple the adhesive layer 70 to the lower housing 80b and another opposing surface that includes an adhesive configured to couple to the patient. In some embodiments, the adhesive on the surface 70a is different from the adhesive on the opposing surface.

In some embodiments and when the power source 40 is a battery, the local device 7 is configured to operate in a battery preservation mode. In some embodiments, the local device 7 automatically enters battery preservation mode upon detection of a disabling event. However, in other embodiments, the user can instruct the local device 7 to enter battery preservation mode. One example of the local device 7 automatically entering the battery preservation mode upon detection of a disabling event includes the microcontroller 30 determining that the temperature detected by the temperature sensor 25 is below a minimum temperature. In some embodiments, the minimum temperature is a minimum temperature associated with the temperature sensor 25 being in thermal contact with the skin of the user or the thermal contact 90 being in contact with the skin of the user. In some embodiments and when the local device 7 is configured to be worn on the torso of the user, the minimum temperature is less than 85 degrees Fahrenheit, less than 80 degrees Fahrenheit, etc. Thus, the detected temperature being below the minimum temperature is an indication that the local device 7 is not coupled to the patient. When this occurs, the control system 85 transitions into a sleep or idle mode. In some embodiments, the local device 7 includes an additional sensor, such as for example, a capacitive sensor, an accelerometer, and an audio sensor (or any combination thereof), with each being in communication with the microcontroller 30. For example, when the additional sensor is the capacitive sensor, the capacitive sensor is positioned to contact the skin of the user when the local device 7 is coupled to the user. Upon determination, by the microcontroller 30 and based on the conditions detected by the capacitive sensor, that the capacitive sensor is no longer in contact with the user, the local device 7 enters battery preservation mode (e.g. sleep or idle mode). However, in some embodiments, when the additional sensor is the accelerometer, the disabling event may be lack of movement (breathing movement) by the user over a period of time, thereby indicating that the monitoring device is not coupled to the user. In other embodiments and when the audio sensor is the additional sensor, the disabling event may be the absence of an audible heartbeat, or other audible marker emitted by the patient, that is detectable when the monitoring device is coupled to the user. The control system 85 may include a combination of sensors to improve the identification of a disabling event. In some instances, when in sleep or idle mode, the control system 85 periodically or intermittently reawakens or partially reawakens to determine if the temperature sensed by the temperature sensor 25 is equal to or greater than the minimum temperature. If so, then the control system 85 resumes normal operations. In other embodiments, and when the microcontroller 30 is wirelessly coupled to a second device via a mobile application and a network, the control system enters battery preservation mode upon receipt of an instruction from the second device via the mobile application and the network. In some embodiments, the remote device is a smart phone, tablet computer, personal digital assistant (PDA), or personal computing device (PCDs), or the like. In other embodiments, the user depresses or otherwise activates an on/off button that is in communication with the microcontroller 30. The input from the on/off button alternatively instructs the local device 7 to enter and exit the battery preservation mode.

In an example embodiment, the local device 7 entering the battery preservation mode preserves battery life. Thus, when the power source 40 is a non-rechargeable battery, the ability to preserve battery life extends the design life of the local device 7.

Figure 5:
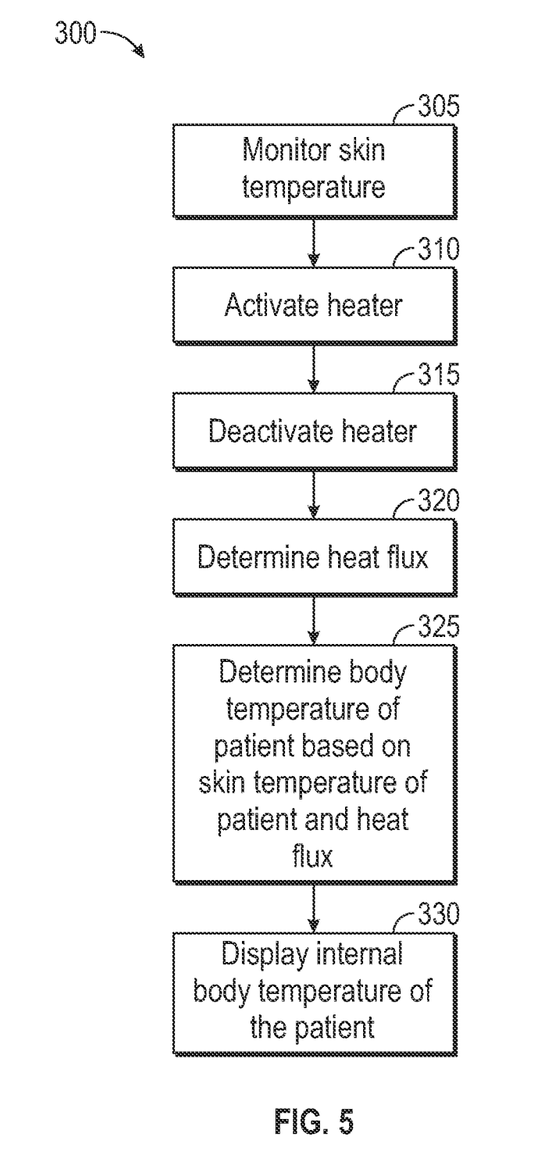
FIG. 5 is a flow chart illustrating a method of operating the system of FIGS. 1-4, according to an example embodiment.

In an example embodiment, as illustrated in FIG. 5 with continuing reference to FIGS. 1-4, a method 300 of operating the local device 7 includes monitoring the skin temperature of the patient 65 at step 305; activating the heater 35 at step 310; deactivating the heater 35 at step 315; calculating the heat flux at step 320; determining the body temperature of the patient 65 based on the skin temperature and the heat flux at step 325; and displaying the internal body temperature of the patient 65 at step 330.

Figure 6:
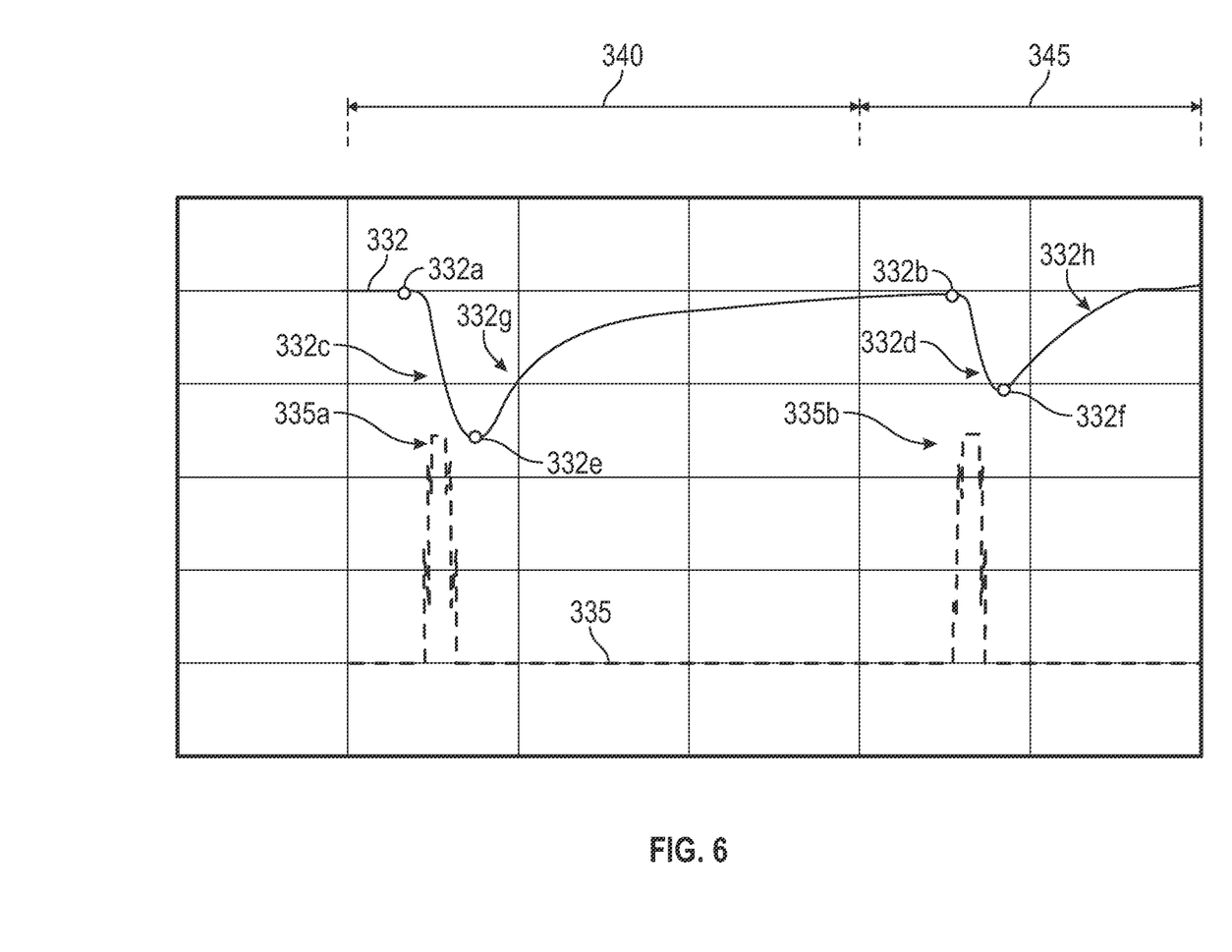
FIG. 6 is a chart relating to use of the system of FIGS. 1-4 during one or more steps of the method of FIG. 5, according to an example embodiment.
Figure 7:
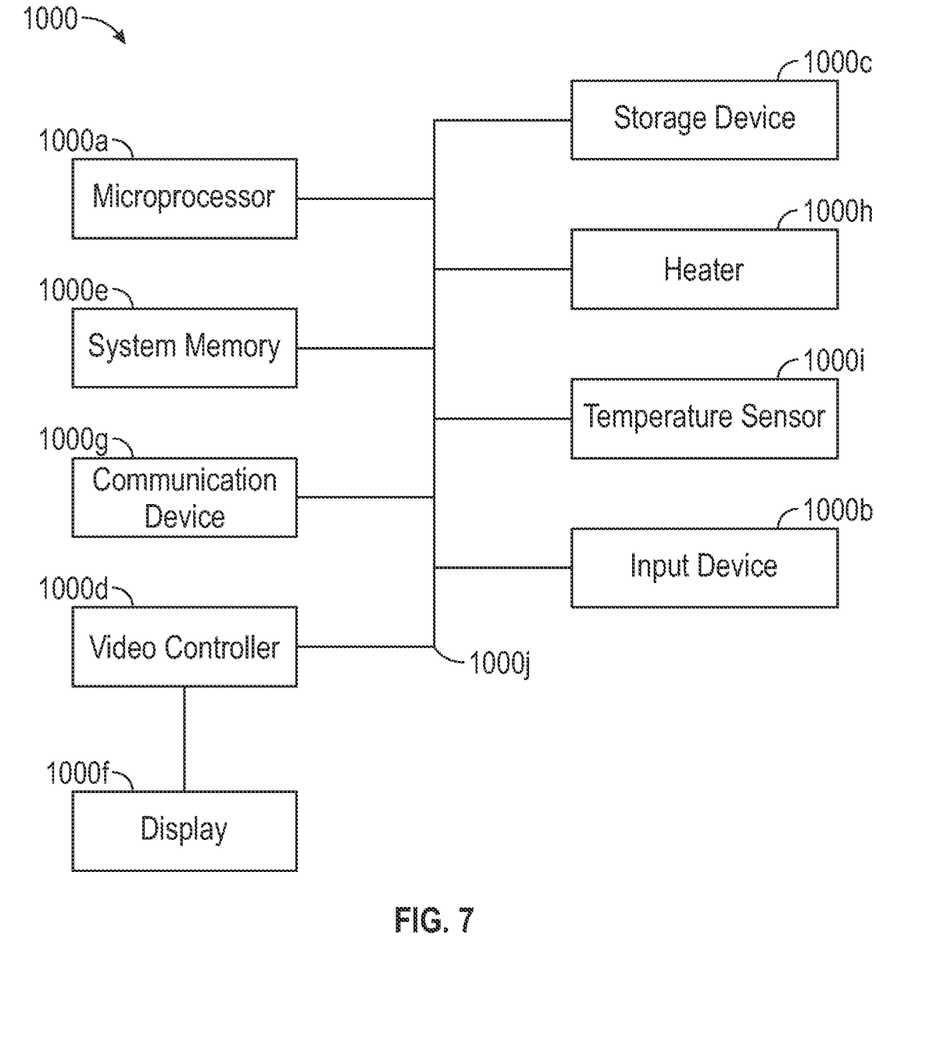
FIG. 7 is a diagrammatic illustration of a node for implementing one or more example embodiments of the present disclosure, according to an example embodiment.

At the step 305, the skin temperature of the patient 65 is measured using the temperature sensor 25 to determine an initial skin temperature. As noted above, the temperature sensor 25 is positioned and configured to monitor the skin temperature of the patient 65. In some embodiments, the temperature sensor 25 monitors the skin temperature continuously. In other embodiments the temperature sensor 25 monitors the skin temperature at predetermined intervals for a predetermined period of time such as for example 5 seconds, 2 seconds, etc. In some embodiments and when variations to the skin temperature are detected during the predetermined period of time, an average, a maximum temperature, or a most recent temperature is considered the initial skin temperature. Regardless, a non-heated skin temperature or the initial skin temperature is determined at the step 305. As illustrated in FIG. 6, the temperature monitored by the temperature sensor 25 is illustrated by the line 332, which is shown as an analog voltage signal that is inversely proportional to the monitored temperature. As illustrated, the local device 7 detects an initial skin temperature during the step 305 represented by point 332a in the line 332. FIG. 6 illustrates two iterations of the method 300. As such, a first iteration is depicted in a portion 340 and a second iteration is depicted in a portion 345. While the second iteration is a subsequent iteration, descriptions of both portions 340 and 345 are described here. An initial skin temperature 332b for the second iteration is illustrated in portion 345.

At the step 310, the heater 35 is activated. As illustrated in FIG. 6, the status of the heater 35 is represented by the line 335. A peak, such as peaks 335a and 335b, represent the heater 35 being activated, or being in an active state. When the heater 35 is activated, or is in the active state, the temperature monitored by the temperature sensor 25 increases. Increases in temperature are represented by the sloped or curved portions 332c and 332d of the line 332. In an example embodiment, a rate of temperature increase is determined using any portion of the curved portions 332c and 332d. Maximum monitored temperatures 332e and 332f are associated with each iteration of the method 300. In some embodiments, the heater 35 is activated, or in the active state, for a predetermined period of time or until the maximum monitored temperature reaches a predetermined temperature. In some embodiments, the heater 35 is activated until the maximum monitored temperature is 5 degrees greater than the initial skin temperature. Generally, when in the active state, the heater 35 is providing heat or applying heat to the skin of the user.

At the step 315, the heater 35 is deactivated. When the heater 35 is deactivated, or in an inactive state, the temperature monitored by the temperature sensor 25 decreases, as represented by the sloped or curved portions 332g and 332h of the line 332. In an example embodiment, a rate of temperature decrease is determined using any portion of the curved portions 332g and 332h. When in the inactive state, the heater 35 is not in the active state. In some embodiments and when the heater 35 is in the inactive state, the heater 35 is not providing heat to the skin of the user or is providing less heat than when the heater 35 is in the active state (e.g., when the heater 35 is cooling off from being in the active state).

At the step 320, the heat flux is determined. In some embodiments, the heat flux is determined using the rate of temperature decrease and/or the rate of temperature increase as monitored during the steps 310 and 315. Often, the rate of temperature decrease, and/or the rate of temperature increase is dependent upon some combination of a local convective heat transfer coefficient, a local radiation heat transfer coefficient, and a local conduction heat transfer coefficient. In some embodiments, the initial skin temperature of the patient is known and the heat transfer rate(s) associated with the heater 35 are known or predicted such that, when evaluating the rate of temperature increase, the local device 7 determines a heat flux based on the rate of temperature increase. In some embodiments, the maximum monitored temperature is known and the rate of temperature decrease is used to determine the heat flux. That is, and in some embodiments, the heat flux is determined based on the rate of temperature decrease and does not consider the rate of temperature increase. In some embodiments, the heat flux is determined using both the rate of temperature increase and the rate of temperature decrease. In some embodiments, the internal body temperature is determined based on one or more temperature measurements and a rate of change of temperature during activation of the heater 35. Thus, the rate of temperature change reflects the effects of ambient conditions on skin temperature. In one embodiment, the data relating to the temperature is received from the temperature sensor 25 and the data relating to the heater (e.g., whether the heater is activated or deactivated) are received by the microcontroller 30. In some embodiments, the microcontroller 30 wirelessly transmits the temperature data and the heater data to the microcontroller 50 in the remote device 10 or to the microcontroller 15 that is remote from the local device 7 and the remote device 10. However, in other embodiments, the microcontroller 30 transmits a summary of the data to the microcontroller 50 and/or the microcontroller 15. Regardless, the system 5 detects or determines the internal body temperature of the patient 65.

Looking to FIG. 6, the portions 340 and 345 are associated with different local conditions and therefore illustrate different heat fluxes. As illustrated, the maximum monitored temperature 332f is lower than the maximum monitored temperature 332e and thus indicates that the local conditions are not conducive to heat transfer from the heater 35 to the patient's skin. In some embodiments, local conditions for portion 345 ("conditions A") are associated with forced air flow, such as the patient 65 being proximate a fan or located outside in windy conditions, while local conditions for portion 340 ("conditions B") are associated with a free flow or reduced air flow. In some embodiments, the heat flux is classified into a set of predetermined activities or conditions. In other embodiments, the rate of temperature increase, the maximum monitored temperature, and the rate of temperature decrease are together classified into a set of predetermined activities or conditions. For example, the local conditions A are classified as typical indoor sedentary activity while local conditions B are classified as windy outdoor conditions. In some embodiments, instead of determining heat flux at step 320, the monitor simply measures rate of increase and/or decrease of temperature during one or more periods of activation and/or deactivation of the heater 35. For example, a high rate of decrease of temperature measurements during a period after the heater 35 is deactivated indicates windy ambient conditions.

At the step 325, the body temperature of the patient is determined or estimated based on the temperature measurements. For example, the body temperature may be determined based on the skin temperature of the patient 65 and the heat flux. That is, the heat flux is used to calibrate the calculation of the internal body temperature of the patient 65 using the skin temperature of the patient 65. For example, when the heat flux is high, e.g., associated with windy outdoor conditions, the local device 7 adjusts the method of calculating the internal body temperature of the patient 65 using the skin temperature of the patient 65. Based on historical data, the initial skin temperature, the heat flux, rate of change of temperature as measured by sensor during and/or after activation of heater 35, and/or optionally other data inputs, the local device 7 calculates the internal body temperature of the patient 65.

At the step 330, the internal body temperature of the patient 65 is displayed. In some embodiments, the internal body temperature of the patient 65 is displayed on the display 47 of the local device 7. In other embodiments, the internal body temperature of the patient 65 is wirelessly sent and received by the remote device 10 and displayed on the remote device 10. In some embodiments, a numerical representation of the internal body temperature is displayed while in other embodiments, the numerical representation is not displayed. Instead, a range of temperatures is displayed or otherwise indicated on the local device 7 or the remote device 10. For example, a green LED light on the local device 7 and/or the remote device 10 is activated when the internal body temperature of the patient 65 is within an acceptable zone, a yellow LED light on the local device 7 and/or the remote device 10 is activated when the internal body temperature of the patient 65 is between the acceptable zone and a fever zone, and a red LED light on the local device 7 and/or the remote device 10 is activated when the internal body temperature of the patient 65 is above or in the fever zone. In some embodiments, instead of a fever zone, a hypothermia or other low temperature warning is displayed. In some embodiments, the step 330 also includes generating an alarm. Generally, the alarm is in response to the system 5 predicting and/or detecting an abnormal internal body temperature such as an internal body temperature that is greater than a predetermined maximum temperature and an internal body temperature that is less than a predetermined minimum temperature. In some embodiments, the predetermined maximum temperature is about (within 2 degrees) 104 degrees Fahrenheit and the predetermined minimum temperature is about 95 degrees Fahrenheit. In some embodiments, the system 5 generates different types of alarms, such as for example the abnormal internal body temperature warning, a detected abnormal internal body temperature alarm, and a predicted abnormal internal body temperature warning. In some embodiments, the remote device 10 generates the alarm(s) such that a caregiver is notified of the condition of the patient 65. For example, when the patient 65 is an infant sleeping in a crib and the caregiver is a parent resting in another room or area, the parent is notified of a potential or predicted abnormal internal body temperature. In some instances, the parent is provided a first and/or the second recommendation such as for example changing the local ambient conditions (e.g., removing the patient 65 to a cooler location) or seeking medical treatment. Thus, the parent can provide adequate care and attention to the infant. The first and/or second recommendations include either an audible recommendation via a speaker (e.g., the alarm device 55) of the remote device 10 or a written message displayed on the display 62 (e.g., the alarm device 55).

In some embodiments, the local device 7 generates an alarm instead of, or in addition to, displaying the internal body temperature at the step 330. In some embodiments, the alarm is generated by the local device 7 via the alarm device 45 and/or by the remote device 10 via the alarm device 55. For example, and when the patient 65 is capable of responding to an alarm (i.e., older child, young adult, or an adult), then an alarm may be generated at the local device 7 to notify the patient 65 of a detected or a predicted, future abnormal internal body temperature. This allows the patient 65 to address the detected temperature or prevent the predicted, future abnormal internal body temperature by for example, relocating to a warmer or cooler location, removing or adding a layer of clothing, etc. For example, and when the local device 7 is monitoring an athlete, the athlete and a coach are notified via alarms using the local device 7 and the remote device 10 of a detected abnormal internal body temperature and/or a predicted abnormal internal body temperature. In another example, and when the local device 7 is monitoring a person that is sleeping outdoors or without reliable heating and/or air conditioning, the person without reliable heating and/or air conditioning and a caregiver or officer are notified via alarms using the local device 7 and the remote device 10 of a detected abnormal internal body temperature and/or a predicted abnormal body temperature. In some embodiments, the system 5 predicts the internal body temperature of the patient 65 based on the monitored skin temperature, the determined heat flux, historical data (e.g., historical skin temperatures), and/or the temperature changes during the steps 310 and 315, which provide indications of the ambient conditions.

At the steps 305-315, the temperature data and heater data are stored in the system 5 as historical temperature and heater data. In some embodiments, the system 5 stores the data associated with each detected abnormal internal body temperature event. In some embodiments, the system 5 requests confirmation that a detected abnormal internal body temperature event is accurate. The request for confirmation may be displayed on the display 62 of the remote device 10 and/or the display 47 of the local device 7. The patient 65 and/or the user of the remote device 10 can provide confirmation via an input button located on the local device 7 and/or the remote device 10. The temperature and heater data may be stored in the microcontroller 30, the microcontroller 50, the microcontroller 15 or any combination thereof. In some embodiments, a patient profile of the patient 65 is stored in one or more of the microcontrollers 15, 30, 50, such that the patient profile is refined with every use of the system 5 by the patient 65. In some instances and when the local device 7 is disposable or has a limited design life, the patient profile is stored in the microcontroller 50 or 15, with the local device 7 being paired such that temperature and heater data is capable of being stored the microcontroller 50 or 15. If a different local device is used to monitor the patient 65, then the temperature and heater data generated by the different local device may also be stored in the patient profile for the patient 65 in the microcontroller 50 and 15.

In some embodiments, the system 5 implements machine learning to refine the measurements and combination of measurements that are classified as an abnormal internal body temperature event. For example, machine learning may be used to refine association of a heat flux with the temperature increases and/or temperature decreases. In some embodiments, the system 5 executes an algorithm to predict and detect abnormal internal body temperatures. In some embodiments, the method 300 also includes receiving feedback relating to the accuracy of the determination of the heat flux with the determined internal body temperature; and changing, based on the feedback, rules implemented (e.g., the algorithm) in the association of the temperature increases/decrease with local heat flux and internal body temperature. In some embodiments, the measurements and combinations of measurements that are classified as an abnormal body temperature event are refined based upon an aggregation of data from multiple users. That is, in some embodiments, data from multiple users can be used to determine the device and the signals that are indicative of abnormal temperatures and to refine the rules implemented in the association of the temperature increases/decrease with local heat flux and internal body temperature. In some embodiments, the method 300 is repeated at a predetermined interval and the heater 35 is activated for a predetermined period of time. In some embodiments, the periods of time associated with each of the steps 305-330 are the same for each iteration or repetition of the method 300. In other embodiments, the periods of time associated with each of the steps 305-330 are determined by the microcontroller 30 or the microcontroller 50 and is in response to an abnormal detected condition, such as a monitored temperature that is outside of a normal range, an increase or decrease in monitored temperature that is abnormal or outside of a predetermined range, a detected power failure, etc.

In some embodiments, the local device 7 has a footprint having a maximum dimension of less than 4 inches, less than 3 inches, less than 2 inches, less than 1 inch, or less than 0.5 inch. In some embodiments, the local device 7 has a footprint that is smaller than a quarter. In some embodiments, the footprint of the local device 7 has a circular shape, an oval shape, a generally rectangular shape, a square shape, a triangular shape, etc. In some embodiments, the local device 7 weighs less than 20 grams, less than 10 grams, and/or less than 5 grams.

In some embodiments, using the local device 7 and/or executing the method 300 results in a more accurate detection and measurement of the internal body temperature of the patient 65. Specifically, determining the local heat flux associated with the local device 7 improves the internal body temperature calculation when using the skin temperature of the patient 65. In some embodiments, the local device 7 consists of a single temperature sensor 25 that is in thermal contact with the skin of the patient and that monitors the variations of the skin temperature in response to the activation and deactivation of the heater 35 to determine a local heat flux. In some embodiments, the use of a single temperature sensor 25 to monitor the temperature of the patient's skin and to calculate the local heat flux reduces the manufacturing complexity of the local device 7, reduces the cost of the local device 7, and reduces the size of the local device 7.

In other embodiments, and when using the local device 7 illustrated in FIG. 4, the rate of temperature increase and decrease determined in the steps 310 and 315 is the rate of temperature increase and decrease within the chamber, which is detected and monitored by the another temperature sensor that continuously monitors and detects a temperature within the chamber. In this embodiment, the lower housing 80*b*, which extends between the heater 35 and the skin of the patient, reduces the effects of the heater 35 on the skin of the patient 65 while retaining the ability to determine or detect the ambient conditions to which the local device 7 is exposed. In this embodiment, the heater 35 is activated, or in the active state, for a predetermined period of time or until a predetermined amount of temperature increase is detected.

In some embodiments, other data inputs used by the local device 7 to calculate the internal body temperature of the patient 65 includes GPS data of the patient 65, local weather conditions associated with the GPS position of the patient 65, verified and independent source on ambient temperature, one or more humidity sensors located on the local device 7, local thermostat settings for the environment in which the patient 65 is located (residential, auto, and/or commercial), movement data associated with the patient 65, ambient conditions detected by another local device that is similar or identical to the local device 7 and that is being worn by another patient that is proximate the patient 65, etc. In some embodiments, the determination of the heat flux and/or the internal body temperature is performed by the microcontroller 30, but in other embodiments the determinations performed by a microcontroller in the remote device 10.

In other embodiments, the microcontroller 15 is a battery-operated hub with a processor. In other embodiments, the microcontroller 15 is omitted or replaced with a remote server (e.g., "the cloud"). Moreover, the system 5 includes, or is at least capable of communicating with, an application server. In some embodiments, a mobile application is stored in the memory of the microcontroller 50, and selectively displayed on the display 62 of the remote device 10 and/or selectively displayed on the display 47 of the local device 7. The mobile application is in communication with the application server via the network 20. The temperature data, the heater data, and/or a summary thereof is received by the application server directly from the local device 7 via the network 20 or is received from the local device 7 via the network 20 and the remote device 10. The application server estimates/predicts an abnormal internal body temperature event and sends instructions to generate the alert to the remote device 10 and/or the local device 7. In some embodiments, the alert includes a push notification displayed on the display 62 of the remote device 10. Thus, while the collection of the temperature data and heater data is performed at the local device 7, there are multiple locations at which the predicting/detecting can occur such as for example, in the microcontroller 50 of the remote device 10, in the microcontroller 15, or in a remote server. Moreover, and in some embodiments, data stored in the microcontroller 50 and/or 15 that is associated with the patient 65 (e.g., data received from the microcontroller 30 of the local device 7) is downloaded in another local device that is similar to the local device 7 and that replaces the local device 7.

In some embodiments and when the local device 7 is a medical bracelet, the alert is generated from the local device 7 and the remote device 10, which is positioned at a location near the caregiver, such as for example a nurse station or other centralized location. In some embodiments, and when the local device 7 forms a portion of an exercise device or an accessory for exercise, such as for example a heart rate monitor, football helmet, or football pads, the patient 65 or user is alerted when the internal body temperature exceeds the maximum temperature or when the predicted internal body temperature is expected to exceed the maximum temperature in order to prevent heat stroke, etc. In some embodiments, and when the local device 7 is worn by the patient 65 and/or when the local device 7 forms a portion of a baby device, an alert is generated at the remote device 10 in order to prevent hypothermia or overheating of the patient 65, which is a child or baby. In some embodiments, the local device 7 is coupled to and monitors animals, such as horses, cows, cats, and dogs.

In some embodiments, the local device 7 and the remote device 10 are relatively close in location (e.g., within a home of the patient or within a unit of a hospital), but in other embodiments the remote device 10 is spaced miles away from the local device 7.

In an example embodiment, as illustrated in FIG. 6 with continuing reference to FIGS. 1-5, an illustrative node 1000 for implementing one or more of the example embodiments described above and/or illustrated in FIGS. 1-5 is depicted. The node 1000 includes a microprocessor 1000a, an input device 1000b, a storage device 1000c, a video controller 1000d, a system memory 1000e, a display 1000f, and a communication device 1000g, a heater 1000h, a temperature sensor 1000i, all interconnected by one or more buses 1000j. In several example embodiments, the storage device 1000c may include a hard drive, CD-ROM, optical drive, any other form of storage device and/or any combination thereof. In several example embodiments, the storage device 1000c may include, and/or be capable of receiving, a CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones. In some embodiments, the heater 1000h may include the heater 35. In some embodiments, the temperature sensor may include the temperature sensor 25.

In several example embodiments, one or more of the components of the systems described above and/or illustrated in FIGS. 1-5, include at least the node 1000 and/or components thereof, and/or one or more nodes that are substantially similar to the node 1000 and/or components thereof. In several example embodiments, one or more of the above-described components of the node 1000, the local device 7 and/or the remote device 10 include respective pluralities of same components.

In several example embodiments, one or more of the applications, systems, and application programs described above and/or illustrated in FIGS. 1-5, include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

Generally, any creation, storage, processing, and/or exchange of user data associated the method, apparatus, and/or system disclosed herein is configured to comply with a variety of privacy settings and security protocols and prevailing data regulations, consistent with treating confidentiality and integrity of user data as an important matter. For example, the apparatus and/or the system may include a module that implements information security controls to comply with several standards and/or other agreements. In some embodiments, the module receives a privacy setting selection from the user and implements controls to comply with the selected privacy setting. In other embodiments, the module identifies data that is considered sensitive, encrypts data according to any appropriate and well-known method in the art, replaces sensitive data with codes to pseudonymize the data, and otherwise ensures compliance with selected privacy settings and data security requirements and regulations.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000*a*, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

It is understood that variations may be made in the foregoing without departing from the scope of the present disclosure.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In one aspect, the present disclosure is directed to a method of monitoring an internal body temperature of a patient, the method comprising: detecting a skin temperature of the patient using a temperature sensor in a body-mountable temperature monitor attached to the patient; calculating, using the temperature sensor, a heat flux associated with the body-mountable temperature monitor based on selectively activating a heater in the body-mountable temperature monitor; and determining the internal body temperature of the patient using the skin temperature and the heat flux. In one embodiment, calculating the heat flux comprises: activating the heater; monitoring a temperature increase during the activation of the heater; deactivating the heater; and monitoring a temperature decrease after the deactivation of the heater; wherein the heat flux is based on the temperature decrease. In one embodiment, the heat flux is further based on the temperature increase. In one embodiment, the body-mountable temperature monitor comprises an adhesive layer and wherein attaching the body-mountable temperature monitor is attached to the skin of the patient via the adhesive layer. In one embodiment, the method further comprises predicting a future internal body temperature based on the heat flux, the skin temperature of the patient, and a historical skin temperature of the patient. In one embodiment, the method further comprises generating an alarm when the internal body temperature of the patient is greater than a predetermined maximum temperature. In one embodiment, the method further comprises generating an alarm when the internal body temperature of the patient is less than a predetermined minimum temperature.

In another aspect, the present disclosure is directed to a body temperature monitor, comprising: an adhesive layer configured to couple the monitor to a skin of a patient; a temperature sensor that is configured to make thermal contact with the skin of the patient, wherein the temperature sensor is configured to detect a skin temperature of the patient; a heater; and a microcontroller that is operably coupled to each of the temperature sensor and the heater; wherein the microcontroller is configured to: receive an initial skin temperature of the patient from the temperature sensor; activate the heater while monitoring the skin temperature of the patient via the temperature sensor; deactivate the heater while monitoring the skin temperature of the patient via the temperature sensor; calculate a local heat flux based on the initial skin temperature and the skin temperatures during the activation and deactivation of the heater; and estimate an internal body temperature of the patient based on the local heat flux and the initial skin temperature. In one embodiment, the monitor further comprises a display, and wherein the microcontroller is further configured to display the internal body temperature on the display. In one embodiment, the microcontroller is further configured to send the internal body temperature to a remote device. In one embodiment, the microcontroller is further configured to receive additional data regarding ambient conditions and wherein the internal body temperature of the patient is further based on the additional data regarding the ambient conditions. In one embodiment, the heater is one of a resistor, a thermistor, and a positive temperature coefficient heater. In one embodiment, the temperature sensor is one of a thermistor, a resistance temperature detector, a capacitance temperature sensor, and a semiconductor device. In one embodiment, wherein the monitor further comprises an alarm device that is configured to generate an alarm when the internal body temperature of the patient is less than a predetermined minimum temperature. In one embodiment, the monitor further comprises an alarm device that is configured to generate an alarm when the internal body temperature of the patient is greater than a predetermined maximum temperature.

In another aspect, the present disclosure is directed to a body-mountable temperature monitor comprising: a substrate; a thermal conductor configured to make thermal contact with a skin of a user; a temperature sensor coupled to the thermal conductor and configured to measure temperature; a heating element; a processor coupled to the temperature sensor and the heating element; wherein the thermal conductor, the temperature sensor, the heating element, and the processor are coupled to the substrate; and an adhesive layer coupled to the substrate and configured to attach the monitor to the skin of the user; wherein the processor is configured to: selectively activate and deactivate the heating element; receive temperature measurements from the temperature sensor before and during a period when the heating element is activated and later during a period when the heating element is deactivated; and calculate an internal body temperature of the user based on a temperature measurement and a rate of change of temperature during either a period when the heating element is activated or the period when the heating element is deactivated or both. In one embodiment, the processor is further configured to receive additional data regarding ambient conditions and wherein the internal body temperature of the user is further based on the additional data regarding the ambient conditions. In one embodiment, the monitor further comprises an alarm device that is configured to generate an alarm when the internal body temperature of the user is less than a predetermined minimum temperature. In one embodiment, the monitor further comprises an alarm device that is configured to generate an alarm when the internal body temperature of the user is greater than a predetermined maximum temperature. In one embodiment, the monitor further comprises a display, and wherein the processor is further configured to display the internal body temperature on the display.

Although several example embodiments have been described in detail above, the embodiments described are example only and are not limiting, and those skilled in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What we claim is:

1. A body temperature monitor, comprising:
   an adhesive layer configured to couple the body temperature monitor to a skin of a patient;
   a temperature sensor that is configured to make thermal contact with the skin of the patient, wherein the temperature sensor is configured to detect a skin temperature of the patient;
   a heater; and
   a microcontroller that is operably coupled to each of the temperature sensor and the heater;
   wherein the microcontroller is configured to:
      receive an initial skin temperature of the patient from the temperature sensor;
      after receiving the initial skin temperature of the patient, activate the heater for a time period and monitor the skin temperature of the patient via the temperature sensor;
      deactivate the heater and monitor the skin temperature of the patient via the temperature sensor;
      calculate a local heat flux based on a rate of change of the skin temperature using the initial skin temperature and at least one of the skin temperatures after the activation of the heater and the skin temperatures after the deactivation of the heater; and
      estimate an internal body temperature of the patient based on the local heat flux and the initial skin temperature received before activating the heater for the time period.

2. The body temperature monitor of claim 1, further comprising a display, wherein the microcontroller is further configured to display the internal body temperature on the display.

3. The body temperature monitor of claim 1, wherein the microcontroller is further configured to send the internal body temperature to a remote device.

4. The body temperature monitor of claim 1, wherein the microcontroller is further configured to receive additional data regarding ambient conditions and wherein the internal body temperature of the patient is further based on the additional data regarding the ambient conditions.

5. The body temperature monitor of claim 1, wherein the heater is one of a resistor, a thermistor, and a positive temperature coefficient heater.

6. The body temperature monitor of claim 1, wherein the temperature sensor is one of a thermistor, a resistance temperature detector, a capacitance temperature sensor, and a semiconductor device.

7. The body temperature monitor of claim 1, further comprising an alarm device that is configured to generate an alarm when the internal body temperature of the patient is less than a predetermined minimum temperature.

8. The body temperature monitor of claim 1, further comprising an alarm device that is configured to generate an alarm when the internal body temperature of the patient is greater than a predetermined maximum temperature.

9. A system for monitoring body temperature, the system comprising:
   a body temperature monitor comprising:
      an adhesive layer configured to couple the body temperature monitor skin of a patient;
      a temperature sensor that is configured to make thermal contact with the skin of the patient, wherein the temperature sensor is configured to detect a skin temperature of the patient; and
a heater; and
a remote device comprising:
  a microcontroller that is operably coupled to each of the temperature sensor and the heater, the microcontroller being configured to:
    receive an initial skin temperature of the patient from the temperature sensor;
    after receiving the initial skin temperature of the patient, activate the heater for a time period and monitor the skin temperature of the patient via the temperature sensor;
    deactivate the heater and monitor the skin temperature of the patient via the temperature sensor;
    calculate a local heat flux based on a rate of change of the skin temperature using the initial skin temperature and at least one of the skin temperatures after the activation of the heater and the skin temperatures after the deactivation of the heater; and
    estimate an internal body temperature of the patient based on the local heat flux and the initial skin temperature received before activating the heater for the time period.

10. The system for monitoring body temperature of claim 9, wherein the remote device is a mobile device.

11. The system for monitoring body temperature of claim 9, wherein the remote device is a smart phone.

12. The system for monitoring body temperature of claim 9, wherein the body temperature monitor comprises a second microcontroller, and wherein the second microcontroller is configured to send the skin temperature of the patient to the microcontroller.

13. The system for monitoring body temperature of claim 9, wherein the body temperature monitor comprises a second microcontroller, and wherein the second microcontroller is configured to send the initial skin temperature of the patient to the microcontroller.

14. The system for monitoring body temperature of claim 9, wherein the body temperature monitor comprises a second microcontroller that is operably coupled to each of the temperature sensor, the heater, and the microcontroller.

15. The system for monitoring body temperature of claim 14, wherein the second microcontroller is operably coupled to the microcontroller by a wireless connection.

* * * * *